Mar. 20, 1923.
E. M. GORRELL
SHOCK ABSORBER
Filed Nov. 14, 1921
1,448,741
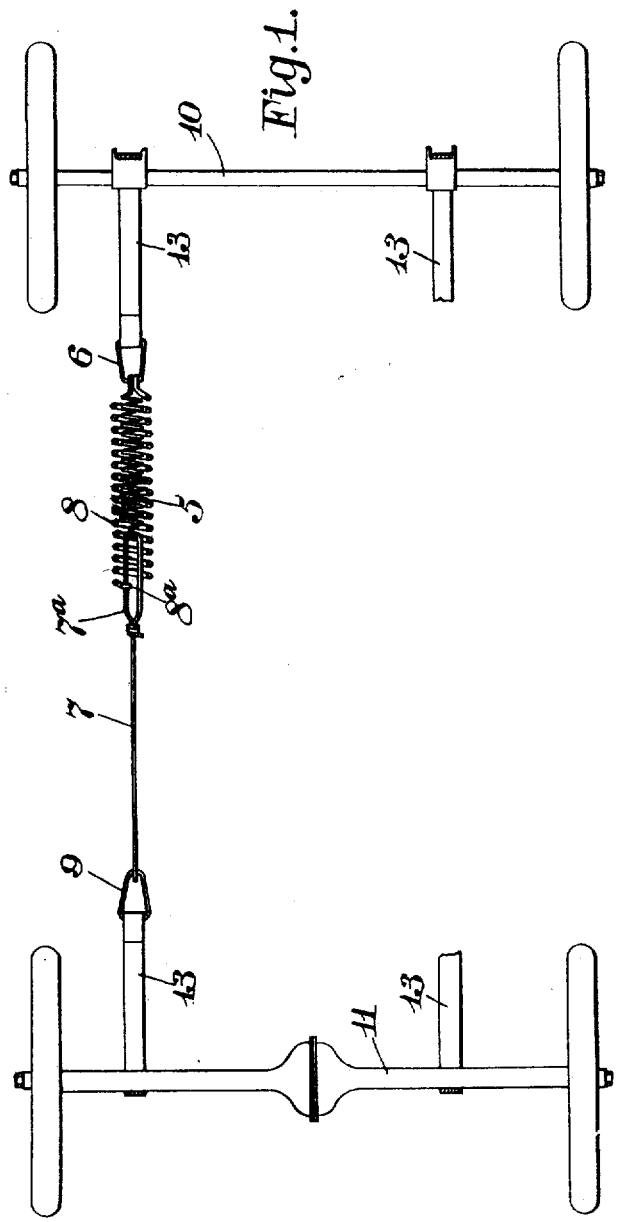
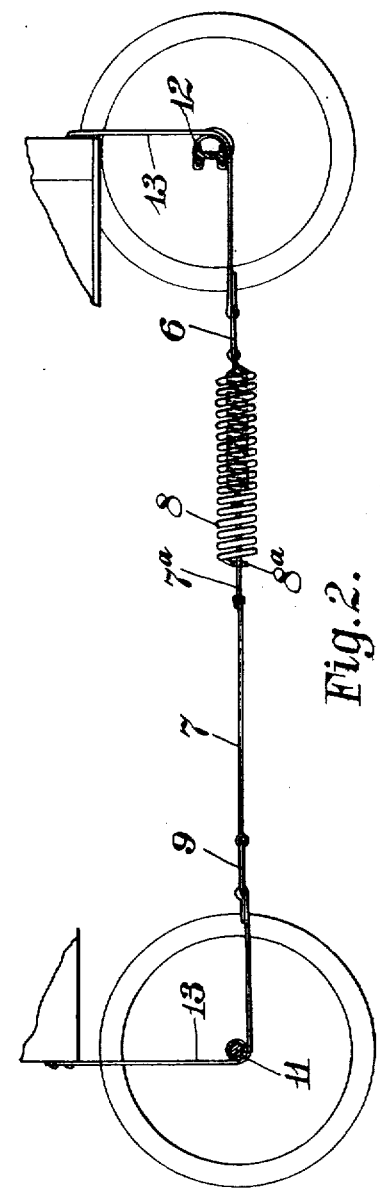
Inventor
Edmund M. Gorrell
by Fincel & Fincel
his Attorneys.

Patented Mar. 20, 1923.

UNITED STATES PATENT OFFICE.

EDMUND M. GORRELL, OF COLUMBUS, OHIO.

SHOCK ABSORBER.

Application filed November 14, 1921. Serial No. 514,861.

*To all whom it may concern:*

Be it known that I, EDMUND M. GORRELL, a citizen of the United States, residing at Columbus, in the county of Franklin and State of Ohio, have invented a certain new and useful Improvement in Shock Absorbers, of which the following is a specification.

The invention relates more particularly to the type of shock absorber in which a snubber is employed whereby excessive violence of the rebound of an automobile body upon its springs when passing over rough roads or obstructions is prevented and thereby renders riding in such vehicle more comfortable. The rebounds referred to may be classified roughly as ordinary or extraordinary the latter being occasioned where the obstruction is relatively large or where the obstruction being not so large but owing to the speed of the vehicle the rebound is increased.

The object of the invention is to provide an improved and simplified form of shock absorber of the type referred to adapted to take care of both the ordinary and extraordinary rebounds, the resistance for taking the latter being in operation added to and supplementing the means provided for taking care of the ordinary shocks.

The invention is embodied in the construction herein shown and described, the features of novelty being finally claimed.

In the accompanying drawing—

Figure 1 is a plan view of the wheels and axles of an automobile showing how my invention is applied thereto.

Fig. 2 is a side view.

In the views 5 designates the internal tension element or coil spring which at one end is attached to a link 6 and at the other to the end of an elongated loop 7a of a wire 7. The character 8 designates the external spring which is attached at one end to the link 6 and has the last coil of its other end bent around a limb of the loop 7a as seen at 8a in such fashion that said end can slide upon that limb but will engage the end of the loop when both springs are sufficiently stretched. The point is that the internal spring can be stretched to some extent before the external spring is caught by the loop 7a to permit its stretching. In practice the tension of the internal spring is made such that it will adequately resist the ordinary rebounds. When the rebound is extraordinary and the internal spring abnormally stretched the external spring is also stretched because the rear coil becomes engaged with the end of the elongated loop 7a so as to be held thereby. The outer spring is preferably made of stouter and stiffer wire than that used for the internal spring.

The wire 7 is attached at its other end to a link 9 and each of the links 6 and 9 is provided with a strap or snubber 13 of tough flexible material, said straps being extended under the front and rear axles 10 and 11 respectively and attached by suitable means at suitable points on the vehicle body or chassis. The attachment of the snubbers is preferably made with the inner springs slightly under tension.

Where the axle under which the snubber passes is circular in cross section, as shown at 11, I have discovered that no provision need be made to insure the frictional work of the snubber without undue wear; but where the axle is angular in cross section as shown in Fig. 2 a small semi-circular metallic flanged clip 12 can be applied, as shown, to the axle to provide a rounding surface under which to pass the snubber.

In operation the inner spring with the friction of the snubbers provides ample resistance to the ordinary rebounds of the vehicle body but when the rebound is extensive or extraordinary the inner spring is stretched until the connection 8a of the outer spring is caught at the end of the loop 7a after which the resistance of the outer spring is added to resist and moderate the rebounds.

The vehicle will ordinarily be equipped with a pair of the devices located substantially as indicated in Fig. 1.

The forms of the parts can be varied without departing from the gist of the invention as claimed.

What I claim is:

A shock absorber for motor vehicles including, in combination two straps one connected to the front and the other to the rear of the chassis to frictionally engage the front and rear axles respectively of the vehicle, and two coil springs one of which has fixed connection with each of said straps while the other has a fixed connection with one of said straps and a sliding connection with the other to resist rebounds by expansion of said springs.

EDMUND M. GORRELL.